United States Patent
Szuba et al.

(10) Patent No.: US 12,430,907 B2
(45) Date of Patent: Sep. 30, 2025

(54) DEVICE, SYSTEM, AND METHOD FOR IMPLEMENTING ROLE-BASED MACHINE LEARNING MODELS

(71) Applicant: MOTOROLA SOLUTIONS, INC., Chicago, IL (US)

(72) Inventors: Janusz Szuba, Cracow (PL); Mariusz Jochymczyk, Cracow (PL); Krzysztof Jasinski, Cracow (PL); Pawel Wilkosz, Cracow (PL); Piotr Matejanka, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 432 days.

(21) Appl. No.: 17/879,577

(22) Filed: Aug. 2, 2022

(65) Prior Publication Data
US 2024/0046633 A1  Feb. 8, 2024

(51) Int. Cl.
*G06K 9/00* (2022.01)
*G06V 10/70* (2022.01)
*G06V 20/52* (2022.01)
*G08B 21/18* (2006.01)

(52) U.S. Cl.
CPC .............. *G06V 10/87* (2022.01); *G06V 20/52* (2022.01); *G08B 21/18* (2013.01)

(58) Field of Classification Search
CPC ........ G06V 10/87; G06V 20/52; G06V 10/82; G08B 13/19613
See application file for complete search history.

(56) References Cited

U.S. PATENT DOCUMENTS

| | | |
|---|---|---|
| 8,493,409 B2 | 7/2013 | Cobb et al. |
| 8,837,906 B2 | 9/2014 | May et al. |
| 9,898,743 B2 | 2/2018 | Bessler et al. |
| 10,861,320 B2 | 12/2020 | Martin et al. |
| 10,911,468 B2 | 2/2021 | Muddu et al. |
| 2012/0288140 A1 | 11/2012 | Hauptmann et al. |
| 2014/0118543 A1 | 5/2014 | Kerbs et al. |
| 2014/0169752 A1* | 6/2014 | May .................... G06F 16/7867 386/224 |

(Continued)

FOREIGN PATENT DOCUMENTS

AU  2018391963 B2  6/2019

*Primary Examiner* — Molly Wilburn
*Assistant Examiner* — Aidan Keup
(74) *Attorney, Agent, or Firm* — PERRY + CURRIER INC.

(57) ABSTRACT

A device, system, and method for implementing role-based machine learning models is provided. A implements a supervisory machine learning model that detects a first role associated with a first object in images received from a camera. The device, from machine learning models, selects and implements a first machine learning model associated with the first role to perform analysis on the images, that is reported to one or more communication devices. After implementing the first machine learning model, the device uses the supervisory machine learning model to determine a second role associated with a second object in the images that is different from the first role, and selects, from the machine learning models, a second machine learning model associated with the second role. The device implements the second machine learning model to perform analysis on the images to change the analysis reported to the one or more communication device.

18 Claims, 5 Drawing Sheets

(56) References Cited

U.S. PATENT DOCUMENTS

| | | |
|---|---|---|
| 2016/0036899 A1 | 2/2016 | Moody et al. |
| 2018/0357552 A1 | 12/2018 | Campos et al. |
| 2021/0304400 A1* | 9/2021 | Bhate ................. G06F 18/2148 |
| 2022/0201202 A1 | 6/2022 | Venetianer et al. |
| 2022/0366275 A1 | 11/2022 | Phua et al. |
| 2023/0103735 A1 | 4/2023 | Niemiec et al. |
| 2023/0112287 A1* | 4/2023 | Kohata .............. G06V 10/7715 382/155 |
| 2023/0222783 A1* | 7/2023 | Bowman ................ G06V 10/87 382/104 |
| 2023/0334814 A1* | 10/2023 | Ranganathan ....... G06N 3/0895 |
| 2023/0360402 A1 | 11/2023 | Szuba et al. |

\* cited by examiner

DEVICE, SYSTEM, AND METHOD FOR IMPLEMENTING ROLE-BASED MACHINE LEARNING MODELS

BACKGROUND OF THE INVENTION

Video cameras are generally equipped with one machine learning model and to recognize objects to generate analysis of images of a scene acquired by the video cameras. However, such analysis may be limited and/or may use excessive processing resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Video cameras are generally equipped with one machine learning model to recognize objects to generate analysis of images of a scene acquired by the video cameras. However, such analysis may be limited and/or may use excessive processing resources. For example, such a machine learning model and/or algorithm may be trained to recognize, in images, objects associated with police incidents, fire incidents, emergency medical incidents, concert events, sporting events, amongst other possibilities and all the objects to be recognized generally require corresponding classifiers and/or neural network layers that are processed regardless of whether a scene being imaged by a camera includes an object or not. Thus, there exists a need for an improved technical method, device, and system for implementing role-based machine learning models.

Hence, provided herein is a device, system, and method for implementing role-based machine learning models. In particular, a computing device may be in communication with a camera at an incident scene, such as a public-incident scene (e.g., a police incident, a fire incident, a medical incident, and the like). The camera may comprise a pan-tilt-zoom (PTZ) such that a scene in a field-of-view (FOV) of the camera changes as the camera reorientates (e.g., pans and/or tilts and/or zooms). For example, as the FOV of view of the camera changes, a camera may initially acquire images of police officers and/or a police car at an incident scene and later acquire images of firefighters and/or a firetruck at an incident scene. The computing device implements a supervisory machine learning model configured and/or trained to determine roles associated with objects detected in the images. For example, the supervisory machine learning model may be trained to detect police officers and/or police cars, and further trained to detect firefighters and/or a firetrucks. Hence, when the supervisory machine learning model detects police officers and/or police cars in the images, the supervisory machine learning model may output a role of "police"; similarly, when the supervisory machine learning model detects firefighters and/or a firetruck in the images, the supervisory machine learning model may output a role of "firefighter".

The computing device further have access to a plurality of machine learning models associated with the different roles output by the supervisory machine learning model. For example, a first machine learning model may be associated with a "police" role, and may be trained to detect objects associated with the "police" role, such objects and/or persons associated with crimes and/or other police-related incidents; such objects may include weapons, and the like. Similarly, a second machine learning model may be trained to detect objects may be associated with a "police" role, and may be trained to detect objects associated with the "police" role with fired and/or other fire-related incidents; such objects may include fire, fire hydrants, and the like.

When the supervisory machine learning model detects an object associated with the "police" role in the images from the camera, the supervisory machine learning model may select the first machine learning model associated with the "police" role. Similarly, when the supervisory machine learning model detects an object associated with the "firefighter" role in the images from the camera, the supervisory machine learning model may select the second machine learning model associated with the "firefighter" role.

Furthermore, as the computing devices changes between processing different machine learning models of the plurality of machine learning models, analysis of the images from the camera also changes, for example to initially identify objects associated with the police role, and then later identify objects associated with the firefighter role. Hence, processing of the images at the computing device becomes more efficient as the computing device implements a respective machine learning model based on roles associated with the images at any given time, such that the computing device is not attempting to identify object associated with a police role and a firefighter role at the same time.

Put another way, rather than implement a generic machine learning model that identifies all objects associated with all types of roles (e.g. public-safety roles and/or other types of roles), the computing device uses the supervisory machine learning model to determine a specific role in images from the camera and implements only those machine learning models that are specific to that role. In this manner, the supervisory machine learning model "supervises" which types of objects that are detected by the computing device.

An aspect of the present specification provides a device comprising: a communication interface; and a controller configured to: receive images from a camera; implement a supervisory machine learning model configured to detect a first role associated with a first object detected in the images; select, from a plurality of machine learning models, using the first role, a first machine learning model associated with the first role; implement the first machine learning model to perform analysis on the images and report, via the communication interface, the analysis to one or more communication devices; determine, after implementing the first machine learning model, using the supervisory machine learning model, a second role associated with a second object detected in the images, the second role different from the first role; select, from the plurality of machine learning models, using the second role, a second machine learning model associated with the second role; implement the second machine learning model to perform respective analysis on the images; and change, via the communication interface, the analysis reported to the one or more communication devices based on implementing the second machine learning model.

Another aspect of the present specification provides a method comprising: receiving, via a computing device, images from a camera; implementing, via the computing device, a supervisory machine learning model configured to detect a first role associated with a first object detected in the images; selecting, via the computing device, from a plurality of machine learning models, using the first role, a first machine learning model associated with the first role; implementing, via the computing device, the first machine learning model to perform analysis on the images and reporting the analysis to one or more communication devices; determining, via the computing device, after implementing the first machine learning model, using the supervisory machine learning model, a second role associated with a second object detected in the images, the second role different from the first role; selecting, via the computing device, from the plurality of machine learning models, using the second role, a second machine learning model associated with the second role; implementing, via the computing device, the second machine learning model to perform respective analysis on the images; and changing, via the computing device, the analysis reported to the one or more communication devices based on implementing the second machine learning model.

Each of the above-mentioned aspects will be discussed in more detail below, starting with example system and device architectures of the system in which the embodiments may be practiced, followed by an illustration of processing blocks for achieving an improved technical method, device, and system for implementing role-based machine learning models.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Figure 1:
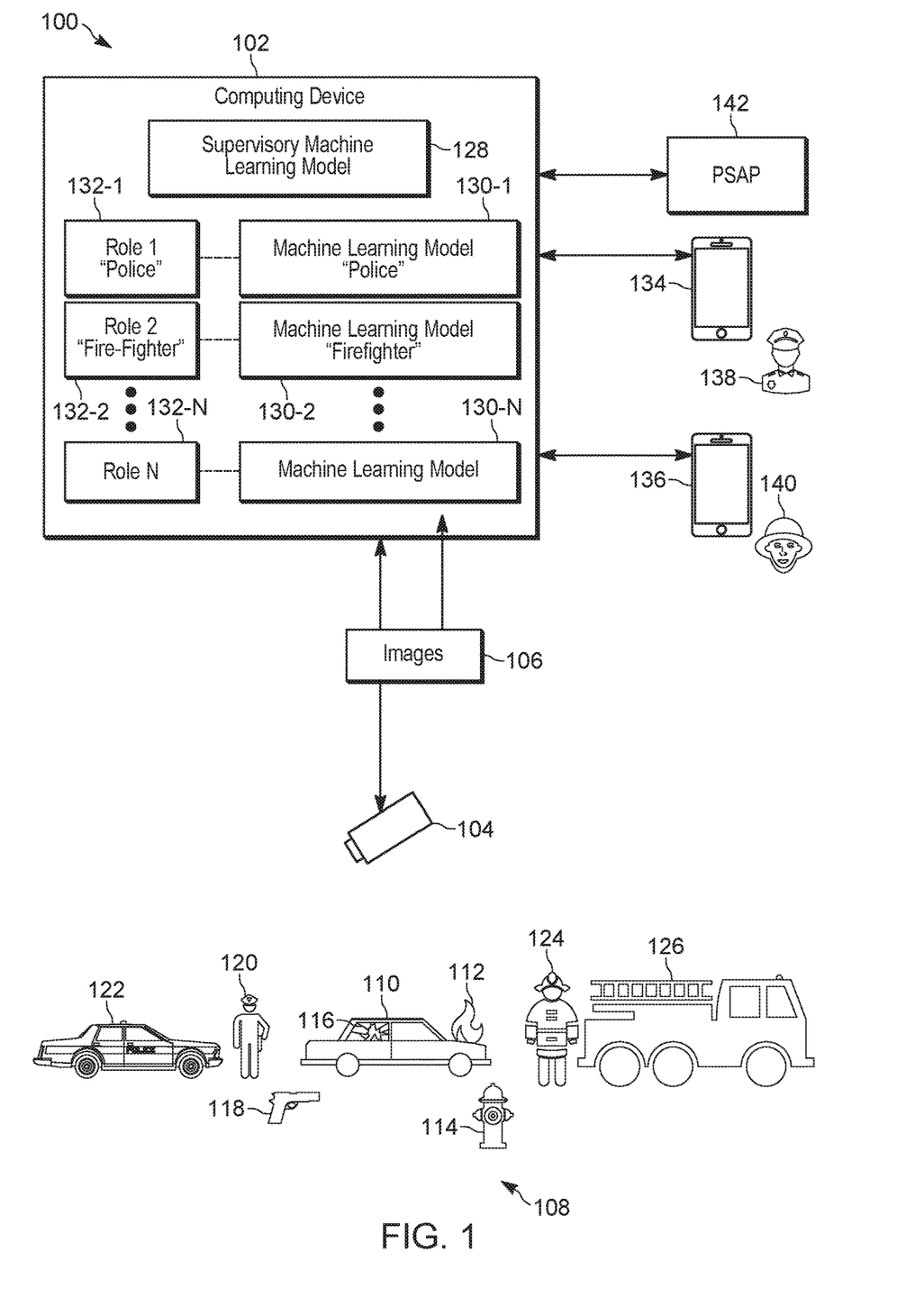
FIG. 1 is a system for implementing role-based machine learning models, in accordance with some examples.

Attention is directed to FIG. 1, which depicts an example system 100 for implementing role-based machine learning models. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a computing device 102 that is interchangeably referred to hereafter as the device 102. The device 102 is in communication with a camera 104 and is receiving images 106 from the camera 104. In some examples, functionality of the device 102 may be distributed over a plurality of servers, a plurality of cloud computing devices and the like.

In some examples, the device 102 may comprise a video analytics engine that is a combination of hardware and software, which may be located at, or in, the camera 104 (e.g., in a system-on-chip architecture and/or any other suitable architecture), and/or in another appliance and/or device, which may be local to, or remote from (e.g., in the cloud), the camera 104. Herein, the term "engine", such as a video analytics engine, is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Details of the device 102 are described in more detail below with respect to FIG. 2.

While only one camera 104 is depicted, the system 100 may comprise more than one camera 104.

The camera 104 may comprise a closed-circuit camera and/or a portable camera and/or a fixed-location camera. In some examples, the camera may comprise a PTZ camera, which may rotate and/or swivel and/or pan and/or tilt and/or zoom, and the like, for example under control of a remote and/or local computing device, such as the device 102, and/or a remote and/or local communication device, such as a communication device of a first responder, a dispatcher at a public-safety answering point (PSAP), a security guard at a control room and the like. Hereafter, movement of the camera 104 will be referred to as the camera 104 changing orientation, which is understood to include one or more of rotating, swiveling, panning tilting, or zooming of the camera 104.

As depicted, the camera 104 is located at a scene of an incident 108, which, as depicted, comprises a vehicle 110 that is on fire 112 and that is adjacent to a fire hydrant 114. A window 116 of the vehicle 110 is broken, and a weapon 118 (e.g., as depicted, a gun) is adjacent the vehicle 110. While not depicted, other types of objects and/or persons and/or actions (e.g., of persons) may be present at the incident 108 that are related to the vehicle 110, such as a driver of the vehicle 110, a perpetrator running away (e.g., an action) from the vehicle 110, a person breaking (e.g., an action) the broken window 116, and the like.

As depicted, a police officer 120 and a police car 122 are located at the incident 108, and a firefighter 124 and a firetruck 126 are also located at the scene of the incident. As depicted, the camera 104 is pointed at the incident 108 in a direction of the police officer 120 and the police car 122, such that images 106 acquired by the camera 104 in the depicted orientation may include the incident 108, and the police officer 120 and the police car 122, but exclude the firefighter 124 and the firetruck 126. However, it is further understood that the camera 104 may change orientation, such that images 106 acquired by the camera 104 may include the incident 108, and the firefighter 124 and the firetruck 126, but exclude the police officer 120 and the police car 122.

As depicted, the device 102 stores:

A supervisory machine learning model 128 configured and/or trained to determine roles associated with objects detected in the images 106. For example, the supervisory machine learning model 128 may be trained to detect specific types of first responders, and the like, (e.g., based on uniforms, body worn devices, and the like) and/or specific types of first responder vehicles, and the like, such that the supervisory machine learning model 128 may distinguish police officers from firefighters, and further distinguish police cars from firetrucks and the like. Indeed, as used herein, the terms "object" and/or "objects" may refer to persons or objects and/or combinations thereof. In general, the supervisory machine learning model 128 may output a role associated with objects in the images 106. For example, when the images 106 are input to the supervisory machine learning model 128, and the images 106 include the police officer 120 and/or the police car 122, the supervisory machine learning model 128 may output a role of "Police". Similarly, when the images 106 are input to the supervisory machine learning model 128, and the images 106 include the firefighter 124 and/or the firetruck 126, the supervisory machine learning model 128 may output a role of "Firefighter". In general, the objects that the supervisory machine learning model 128 are trained to detect may generally comprise, and/or be limited to, objects used to detect a type and/or role of first responders on a scene of an incident. Put another way, in specific examples, the terms "role" and/or "roles" may comprise types of first responders.

A plurality of machine learning models 130-1, 130-2, . . . 130-N stored in association with respective role data, referred to hereafter for simplicity as roles 132-1, 132-2, . . . 132-N. The plurality of machine learning models 130-1, 130-2, . . . 130-N are interchangeably referred to hereafter, collectively, as the machine learning models 130 and, generically, as a machine learning model 130. This convention will be used throughout the present specification. For example, the plurality of roles 132-1, 132-2, . . . 132-N (e.g., plurality of sets of role data) are interchangeably referred to hereafter, collectively, as the roles 132 and, generically, as a role 132. An "N" number of machine learning models 130 and roles 132 are depicted, and "N" may be any suitable number that is "2" or more. Each of the machine learning models 130 are configured and/or trained to perform analysis on the images 106 (and/or images in general), for example to detect objects and/or persons and/or actions relevant to the different roles 132. For example, a first machine learning model 130-1 associated with a role 132-1 of "Police" may be trained to detect objects and/or persons and/or actions of interest to the police (e.g., such as the police officer 120) such as weapons (e.g., the weapon 118) and/or other indications of crime, such as the broken window 116.

Non-limiting examples of persons detected by the first machine learning model 130-1 may include, but is not limited to, persons holding weapons, wearing masks, and the like. Non-limiting examples of actions detected by the first machine learning model 130-1 may include, but is not limited to, persons running away from the incident 108, persons making threatening noises and/or threatening actions (such as holding up their fists), and the like.

Similarly, a second machine learning model 130-2 associated with a role 132-2 of "Firefighter" may be trained to detect objects and/or persons and/or actions of interest to firefighters (e.g., such as the firefighter 124) such as fire (e.g., the fire 112) and/or other types of fire-related objects (e.g., such as the hydrant 114).

Non-limiting examples of persons detected by the second machine learning model 130-2 may include, but is not limited to, persons holding gasoline cans, matches, and the like. Non-limiting examples of actions detected by the first machine learning model 130-1 may include, but is not limited to, persons starting fires, movement of fires, and the like.

However, other types of machine learning models 130 and associated roles 132 are within the scope of the present specification; for example, some machine learning models 130 may be further associated with incident types, and the like. For example, a police-related role 132 may comprise a role of "Police-Accident" (e.g., an incident type of an accident", and another police-related role 132 may comprise a role of "Police-Stolen Car" (e.g., an incident type of a stolen car), with associated machine learning models 130 trained to respectively detect objects associated with accidents and stolen cars.

Similarly, a firefighter-related role 132 may comprise a role of "Firefighter—Car Fire" (e.g., an incident type of a car fire", and another firefighter-related role 132 may comprise a role of "Firefighter—House Fire" (e.g., an incident type of a house fire), with associated machine learning models 130 trained to respectively detect objects associated with car fires and house fires.

While the supervisory machine learning model 128 and the machine learning models 130 (and associated roles 132) are depicted as being stored at the device 102, in other examples, the supervisory machine learning model 128 and/or the machine learning models 130 (and associated roles 132) may be stored in a memory external but accessible to the device 102.

As depicted, the system 100 further comprises one or more communication devices 134, 136 operated by respective users 138, 140 and a public-safety answering point (PSAP) 142. The device 102 is in communication with the communication devices 134, 136 and the PSAP 142 (e.g., a 911 call center, a dispatch center for first responders, and the like).

However, while the present application is described with respect to a PSAP 142, the PSAP 142 may alternatively be replaced with any suitable call answering point, and the like, such as a control room in a stadium or concert hall, and/or other venues, and the like, where the camera 104 may be located (e.g. either inside or outside the stadium, concert hall, and the like). Hence, it is understood that while specific examples of roles described herein include police and firefighters, and the like, such roles may include roles of any suitable personnel who may be implementing security in such venues, such as security guards and/or different types of security guards, and/or private security guards, private medical technicians, and the like, though such roles may include, but are not limited to, public-safety roles such as police, firefighters, EMTs, and the like.

As depicted, the users 138, 140 may respectively comprise a police officer and a firefighter (or any suitable first responder, and the like) including, but not limited to, respectively the police officer 120 and the firefighter 124, but the users 138, 140 may comprise any suitable user such, respectively, supervisor of the police officer 120 and the firefighter 124, a dispatcher at the PSAP 142, a security guard at a control room, and/or any other suitable user.

While the communication devices 134, 136 are depicted in a format of a mobile device, communication devices 134, 136 may be in any suitable respective format including, but not limited to, a laptop computer, a personal computer, a terminal, a PSAP terminal, and the like. When one or more of the communication devices 134, 136 comprises a PSAP terminal, one or more of the communication devices 134, 136 may be a component of the PSAP 142, and the like.

In general the device 102 is configured to implement (e.g., process) the supervisory machine learning model 128 to determine a first role 132 (e.g., any of the roles 132) associated with an object detected in the images 106, for example to detect a type and/or role of first responders on a scene of an incident. The first role 132 is used to select a first machine learning model 130 associated with the first role 132. The first machine learning model 130 is implemented by the device 102 to perform analysis on the images 106, and report the analysis to one or more communication devices, such as the communication devices 134, 136. The device 102 continues to implement the supervisory machine learning model 128 to continue to determine roles 132 associated with objects detected in the images 106, which may change as the camera 104 changes orientation.

For example, after implementing the first machine learning model 130, using the supervisory machine learning model 128, the device 102 may determine a second role 132 associated with other objects detected in the images 106, which is different from the first role 132. Such a determination may occur as the camera 104 changes orientation. The second role 132 is used to select a second machine learning model 130 associated with the second role 132, and the second machine learning model 130 is implemented by the device 102 to perform analysis on the images 106, and report the analysis to the one or more communication devices, such as one or more of the communication devices 134, 136. In particular, the analysis reported to the one or more communication devices changes based on which machine learning model 130 is being implemented.

Furthermore, a communication device 134, 136, to which the analysis is reported, may depend on the role 132 determined by the supervisory machine learning model 128; for example, the communication device 134 may be associated with police officers and hence when the role 132 determined by the supervisory machine learning model 128 comprises the role 132-1 of "Police" the analysis may be reported to the communication device 134, but not the communication device 136. Conversely, the communication device 136 may be associated with firefighters and hence when the role 132 determined by the supervisory machine learning model 128 comprises the role 132-2 of "Firefighter" the analysis may be reported to the communication device 136, but not the communication device 134. Such associations between the communication device 134, 136 and the roles 132 may also be stored at the memory 220, and the like.

Hence, the supervisory machine learning model 128 plays a supervisory function for the device 102, enabling the device 102 to select machine learning models 130 to implement based, for example, on whether a police officer or a firefighter is detected in the images 106.

Figure 2:
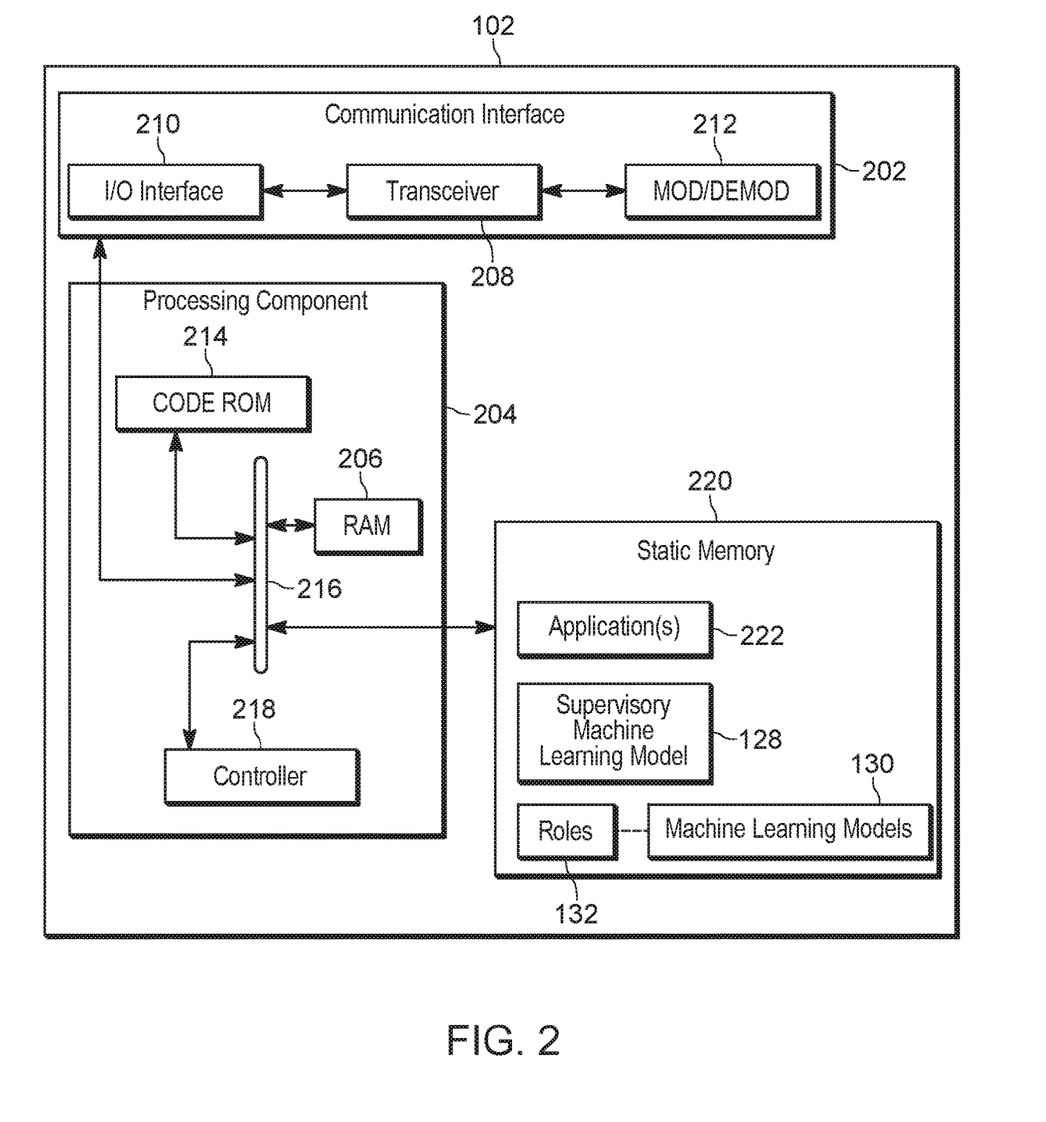
FIG. 2 is a device diagram showing a device structure of a communication device for implementing role-based machine learning models, in accordance with some examples.

Attention is next directed to FIG. 2, which depicts a schematic block diagram of an example of the device 102. While the device 102 is depicted in FIG. 2 as a single component, functionality of the device 102 may be distributed among a plurality of components, such as a plurality of servers and/or cloud computing devices.

As depicted, the device 102 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the device 102 via the common data and address bus 216. Hereafter, the at least one application 222 will be interchangeably referred to as the application 222. The memory 220 also stores the supervisory machine learning model 128, the machine learning models 130 and the associated roles 132.

Furthermore, while the memories 206, 214 are depicted as having a particular structure and/or configuration, (e.g., separate RAM 206 and ROM 214), memory of the device 102 may have any suitable structure and/or configuration.

While not depicted, the device 102 may include one or more of an input component and/or a display screen, which, when present, may be communicatively coupled to the controller 218.

As shown in FIG. 2, the device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100.

In particular, the communication interface 202 is configured to communicate with the camera 104, the communication devices 134, 136 and the PSAP 142.

Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the device 102 is not a generic controller and/or a generic device, but a device specifically configured to implement functionality for implementing role-based machine learning models. For example, in some examples, the device 102 and/or the controller 218 specifically comprises a computer executable engine configured to implement functionality for implementing role-based machine learning models.

The static memory 220 comprises a non-transitory machine readable medium that stores machine readable instructions to implement one or more programs or applications. Example machine readable media include a non-volatile storage component (e.g., Erasable Electronic Programmable Read Only Memory ("EEPROM"), Flash Memory) and/or a volatile storage component (e.g., random-access memory ("RAM")). In the example of FIG. 2, programming instructions (e.g., machine readable instructions) that implement the functionality of the device 102 as described herein are maintained, persistently, at the memory 220 and used by the controller 218, which makes appropriate utilization of volatile storage during the execution of such programming instructions.

Figure 3:
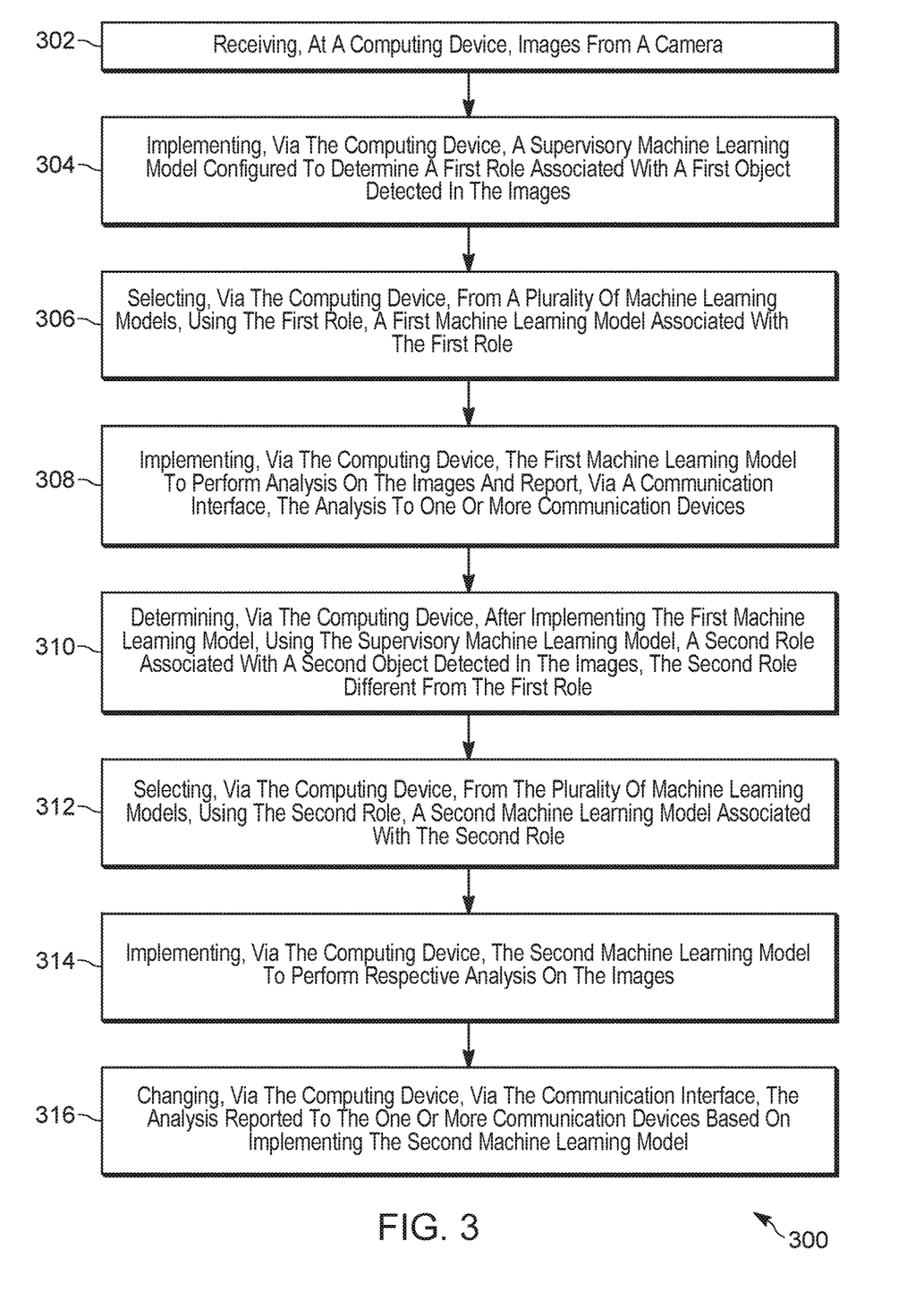
FIG. 3 is a flowchart of a method for implementing role-based machine learning models, in accordance with some examples.

Furthermore, the memory 220 stores instructions corresponding to the at least one application 222 that, when executed by the controller 218, enables the controller 218 to implement functionality for implementing role-based machine learning models, including but not limited to, the blocks of the method set forth in FIG. 3.

In illustrated examples, when the controller 218 executes the one or more applications 222, the controller 218 is enabled to receive images from a camera; implement a supervisory machine learning model configured to determine a first role associated with a first object detected in the images; select, from a plurality of machine learning models, using the first role, a first machine learning model associated with the first role; implement the first machine learning model to perform analysis on the images and report, via the communication interface, the analysis to one or more communication devices; determine, after implementing the first machine learning model, using the supervisory machine learning model, a second role associated with a second object detected in the images, the second role different from the first role; select, from the plurality of machine learning models, using the second role, a second machine learning model associated with the second role; implement the second machine learning model to perform analysis on the images; and change, via the communication interface, the analysis reported to the one or more communication devices based on implementing the second machine learning model.

Each of the supervisory machine learning model 128 and the machine learning models 130 may models implemented via one or more of: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some environments, such schools, prisons, and the like. Any suitable combination of machine-learning models and/or algorithms and/or deep learning models and/or algorithms and/or neural networks is within the scope of present examples.

It is further understood that the machine learning models 128, 130 may be operated in a training mode to train the machine learning models 128, 130 to implement functionality as described herein. Furthermore, a machine learning feedback loop may be implemented to better train the machine learning models 128, 130 to implement functionality as described herein.

While details of the communication devices 134, 136 and the PSAP 142 are not depicted, the communication devices 134, 136 and the PSAP 142 may have components similar to the device 102 but adapted, for the respective functionality thereof. For example, the communication devices 134, 136 may include respective display screens for rendering messages received from the device 102, and the PSAP 142 may comprise one or more PSAP terminals that includes a respective display screen and a respective headset for a PSAP operator and/or a dispatcher, and the like.

Attention is now directed to FIG. 3, which depicts a flowchart representative of a method 300 for implementing role-based machine learning models. The operations of the method 300 of FIG. 3 correspond to machine readable instructions that are executed by the device 102, and specifically the controller 218 of the device 102. In the illustrated example, the instructions represented by the blocks of FIG. 3 are stored at the memory 220 for example, as the application 222. The method 300 of FIG. 3 is one way that the controller 218 and/or the device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the device 102, receives (e.g., via the communication interface 202) the images 106 from the camera 104, as described with respect to FIG. 1.

At a block 304, the controller 218, and/or the device 102, implements the supervisory machine learning model 128 configured and/or trained to determine a first role 132 associated with a first object detected in the images 106.

For example, as described with respect to FIG. 1, the supervisory machine learning model 128 are trained to detect objects used to detect a type and/or role of first responders, and the like, on a scene of an incident, and output a corresponding role of such first responders, and the like. The first responders that the supervisory machine learning model 128 is trained to detect may include, but is not limited to, police, firefighters, emergency medical technicians, security personnel (e.g., of private security companies) and the like. However, the supervisory machine learning model 128 may be trained to detect a type and/or role of any suitable persons and/or vehicle, and the like, that may respond to an incident and/or public-safety incident.

Furthermore, the first role 132 that is determined and/or output by the supervisory machine learning model 128 may comprise any of the roles 132, depending on which first responders (and/or their vehicles) are detected in the images 106. While the term "first role" is used herein, the term "first role" may refer to any of the roles 132, and not necessarily role 132-1. However, for illustrative purposes only, at the block 304, the supervisory machine learning model 128 may detect the police officer 120 and/or the police car 122 in the images 106, and output the first role 132-1 of "Police".

At a block 306, the controller 218, and/or the device 102, selects, from the plurality of machine learning models 130, using the first role 132-1, a first machine learning model 130-1 associated with the first role 132-1. In particular, continuing with the example, the first role 132-1 of "Police" is used to select the first machine learning model 130-1 configured and/or trained to detect objects associated with police incidents, such as the broken window 116 and/or the weapon 118, and the like.

At a block 308, the controller 218, and/or the device 102, implements the first machine learning model 130-1 to perform analysis on the images 106 and report, via the communication interface 202, the analysis to one or more communication devices.

For example, the first machine learning model 130-1 may be used to detect, in the images 106, objects associated with police incidents, such as the broken window 116 and/or the weapon 118, and report the objects to the communication device 134 (e.g., which may be associated with the first role 132-1 at the memory 220). Hence, the user 138 (who may be the police officer 120 or a dispatcher at the PSAP 142, and the like) is generally alerted to such objects.

The analysis of the block 308 may include, but is not limited to, including portions of the images 106 that include the objects detected by the first machine learning model 130-1, such as a portion of an image 106 that includes the broken window 116 and a portion of an image 106 that includes the weapon 118. Such analysis in the form of a report may be provide to communication devices of police officers (e.g., the police officer 120) at the scene of the incident 108 to alert them to presence of the objects. Such analysis and/or the report may include, but is not limited to, annotating the portions of the images 106 that include the objects detected by the first machine learning model 130-1, for example, by labeling and/or highlighting, and the like such objects. Examples of such annotations are described with respect to FIG. 4.

At a block 310, the controller 218, and/or the device 102, determines, after implementing the first machine learning model 130-1, using the supervisory machine learning model 128, a second role 132 associated with a second object detected in the images 106, the second role 132 different from the first role 132.

For example, the orientation of the camera 104 may be changeable and the second object is detected in the images 106 as the orientation of the camera 104 changes.

For example, an orientation of the camera 104 may change such that the police officer 120 and/or the police car 122 are no longer in the images 106, but the firefighter 124 and/or the firetruck 126 are in the images 106. As such, the supervisory machine learning model 128 may output the second role 132-2 of a "Firefighter". However, like the term "first role", the term "second role" may refer to any of the roles 132 (e.g., other than the role 132 determined at the block 304), and not necessarily the role 132-2.

At a block 312, the controller 218, and/or the device 102, selects, from the plurality of machine learning models 130, using the second role 132-2, the second machine learning model 130-2 associated with the second role 132-2.

In particular, continuing with the example above, the second role 132-2 of "Firefighter" is used to select the second machine learning model 130-2 configured and/or trained to detect objects associated with firefighter incidents, such as the fire 112 and/or the fire hydrant 114, and the like.

At a block 314, the controller 218, and/or the device 102, implements the second machine learning model 130 to perform respective (and/or additional) analysis on the images 106.

For example, the second machine learning model 130-2 may be used to detect, in the images 106, objects associated with firefighting incidents, such as the fire 112 window 116 and/or the fire hydrant 114, and report the objects to the communication device 136 (e.g., which may be associated with the second role 132-2 at the memory 220). Hence, the user 140 (who may be the firefighter 124 or a dispatcher at the PSAP 142) is generally alerted to such objects.

The analysis of the block 314 may include, but is not limited to, including portions of the images 106 that include the objects detected by the second machine learning model 130-2, such as a portion of an image 106 that includes the fire 112, and a portion of an image 106 that includes the fire hydrant 114. Such analysis in the form of a report may be provide to communication devices of firefighters (e.g., the firefighter 124) at the scene of the incident 108 to alert them to presence of the objects. Such analysis and/or the report may include, but is not limited to, annotating the portions of the images 106 that include the objects detected by the second machine learning model 130-2, for example, by labeling and/or highlighting, and the like such objects. Examples of such annotations are described with respect to FIG. 5.

Hence, at a block 316, the controller 218, and/or the device 102, changes, via the communication interface 202, the analysis reported (e.g., via the communication interface 202) to the one or more communication devices based on implementing the second machine learning model 130.

It is understood, in the method 300, that the plurality of machine learning models 130 are generally configured to detect one or more of respective objects, respective persons and respective actions such that the analysis by the first machine learning model 130-1 and the second machine learning model 130-2 results in one more of different objects, different persons and different actions being detected, which may be reported as the analysis changes.

In some examples, the controller 218, and/or the device 102 may implement all the machine learning models 130 associated with roles 132 determined by the supervisory machine learning model 128.

However, in other examples, the method 300 may further comprise, the controller 218, and/or the device 102: determining, using the supervisory machine learning model 128, that the first object (e.g., detected at the block 304) is no longer detected in the images 106; and, in response stopping the implementing of the first machine learning model 130-1.

Hence, for example, as the camera 104 changes orientation and the police officer 120 and the police car 122 no longer appear in the images 106, as determined by the supervisory machine learning model 128, the controller 218, and/or the device 102 may stop implementing the first machine learning model 130-1. Such a situation may occur regardless of whether the firefighter 124 and the firetruck 126 appear in the images 106. For example, when none of the police officer 120, the police car 122, the firefighter 124 and the firetruck 126 appear in the images 106, the supervisory machine learning model 128 may output a null result and the controller 218, and/or the device 102 may stop implementing the first machine learning model 130-1.

Similarly, when the role 132 output by the supervisory machine learning model 128 changes from the first role 132-1 to the second role 132-2, the controller 218, and/or the device 102 may stop implementing the first machine learning model 130-1 (and start implementing the second machine learning model 130-2).

Put another way, the method 300 may further comprise, the controller 218, and/or the device 102: determining, using the supervisory machine learning model 128, that when the second object (e.g., of the block 310) is detected in the images 106, the first object (e.g., of the block 304) is no longer detected in the images 106; and, in response stopping the implementing of the first machine learning model 130-1.

In some examples, the supervisory machine learning model 128 may output more than one role 132, such as the first role 132-1 and the second role 132-2 (e.g., when both the police officer 120 and/or the police car 122, and the firefighter 124 and/or the firetruck 126 appear in the images 106), and the method 300 may further comprise, the controller 218, and/or the device 102: implementing all machine learning model 130 that correspond to determined roles 132, at least until objects that caused the roles 132 to be determined are no longer in the images 106. For example, when objects that caused a role 132 to be determined by the supervisory machine learning model 128 are no longer in the images 106, the controller 218 and/or the device 102 may stop implementing such a machine learning model 130.

Hence, as the roles 132 output by the supervisory machine learning model 128 change, the machine learning models 130 implemented by the controller 218 and/or the device 102 change.

In some examples, the method 300 the controller 218 and/or the device 102: implement the supervisory machine learning model 128 that is further configured and/or trained to detect (e.g., at the block 304) the first role 132-1 of the first object detected in the images 106 by: generating, via the supervisory machine learning model 128, a ranked list of roles 132 of the first object; and selecting, via the supervisory machine learning model 128, the first role of the object from the ranked list of roles 132.

For example, the supervisory machine learning model 128 may output a plurality of roles 132, for example as a list of roles 132, depending on which objects are detected in the images 106, and assign a confidence score to each role 132. Roles 132 with higher confidence scores are understood to be higher ranked in the list of roles 132, while roles 132 with lower confidence scores are understood to be lower ranked in the list of roles 132. In particular, as the supervisory machine learning model 128 is trained to detect different objects associated with different roles 132, the supervisory machine learning model 128 may output all the roles 132 that the supervisory machine learning model 128 is trained to determine and assign respective confidence scores to each role 132. In some of these examples, role 132 with a highest confidence score may be used to select a corresponding machine learning model 130 that is implemented by the controller 218 and/or the device 102, while other roles 132 and corresponding machine learning models 130 are ignored. In other examples, roles 132 with confidence scores above a threshold confidence score (e.g., such as 90%, 95%, amongst other possibilities) may be used to select corresponding machine learning models 130 that is implemented by the controller 218 and/or the device 102, while other roles 132 below the threshold confidence score, and corresponding machine learning models 130, are ignored. The supervisory machine learning model 128 may continue to output confidence scores for the roles 132 and change the corresponding machine learning models 130 that are implemented as the confidence scores fall above or below the threshold confidence score.

As previously mentioned, in some examples, roles 132 may be particular to given incident types, and the supervisory machine learning model 128 may be further configured to detect, in the images 106, incident types of incidents. In these examples, the method 300 may further comprise, the controller 218 and/or the device 102: determining, via the supervisory machine learning model 128, a first incident type of an incident in the images, wherein one or more of the first machine learning model 130-1 and the second machine learning model 130-2 are further selected based on the first incident type; determining, via the supervisory machine learning model 128, that an incident type of the incident has changed from the first incident type to a second incident type; and changing, from the plurality of machine learning models 130, one or more of the first machine learning model 130-1 and the second machine learning model 130-2 to a further machine learning model selected based on the second incident type. As the incident type changes, and a further machine learning model is selected, objects detected in the analysis of the block 310 and/or the block 314 may change.

For example, the supervisory machine learning model 128 may initially output a role 132 of "Police—Accident" and select a corresponding machine learning model 130 accordingly. However, later, the supervisory machine learning model 128 output a role 132 of "Police—Stolen Car" and change to a corresponding machine learning model 130 accordingly. Such a change may occur whether the camera 104 changes orientation or not, for example, as objects in the FOV of the camera 104 change. For example, while not depicted in FIG. 1, the vehicle 110 on fire may first be detected with the police officer 120, and later a perpetrator fleeing the incident 108 may be detected. As the incident type changes, different types of objects reported in the analysis may change. For example, for the role 132 of "Police—Accident", the broken window 116 may be reported in the analysis, but not the weapon 118, however for the role 132 of "Police—Stolen Car", the weapon 118 may be reported in the analysis, but not the broken window 116.

Similarly, as the orientation of the camera 104 changes, the supervisory machine learning model 128 may output a role 132 of "Firefighter—Car Fire" and select a corresponding machine learning model 130 accordingly. However, later, the supervisory machine learning model 128 output a role 132 of "Firefighter—House Fire" and change to a corresponding machine learning model 130 accordingly. Such a change may occur whether the camera 104 changes orientation or not, for example, as objects in the FOV of the camera 104 change. For example, while not depicted in FIG. 1, the vehicle 110 on fire may be detected with the firefighter 124, and the vehicle 110 may be adjacent a house on fire, which may be detected in the images 106 after the vehicle 110 is detected. As the incident type changes, different types of objects reported in the analysis may change. For example, for the role 132 of "Firefighter—Car Fire", the fire 112 and the hydrant 114 may be reported in the analysis, however for the role 132 of "Firefighter—House Fire", the fire 112 and the hydrant 114 may be reported in the analysis, as well as the house on fire.

In some of these examples, similar to the roles 132, one or more of the first incident type and the second incident type may be selected from a ranked list of incident types generated by the supervisory machine learning model 128.

In some of these examples, in response to the incident changing from the first incident type to the second incident type, the controller 218 and/or device 102 may provide an alert to the one or more communication devices 134, 136 for example that indicates that a type of incident has changed.

In some examples, the PSAP 142 may have access to information indicating first responders that are dispatched to an incident. Returning to the example of FIG. 1, the police officer 120 may arrive at the incident 108 first, and the firefighter 124 may be later dispatched to the incident 108 (e.g., after the police officer 120 calls the incident in to the PSAP 142). In some of these examples, the controller 218 and/or the device 102 may not implement the second machine learning model 130-2 until the firefighter 124 arrives at the incident 108 and is detected in the images 106. However, in some circumstances, information in the images 106 related to the fire 112, that may be of interest to the firefighter 124 may not be detected (e.g., the fire 112 may die down) either before or after the firefighter 124 arrives at the incident 108. Hence, in some of these examples, the method 300 may further comprise the controller 218 and/or the device 102: prior to the supervisory machine learning model 128 detecting the second object (e.g., the firefighter 124) in the images 106 (e.g., prior to the block 310), receiving, via the communication interface, 202 an indication that the second object is one or more of on route to a location of the camera 104 (e.g., the firefighter 124 has been dispatched to the incident 108) and located at the location of the camera 104 (e.g., the firefighter 124 has arrived at the incident 108); and, in response, implementing the second machine learning model 130-2.

For example, the PSAP 142 may transmit an indication to the device 102 indicating that the firefighter 124 has been dispatched to the incident 108 and/or, when the firefighter 124 arrives at the incident 108, the firefighter 124 may inform the PSAP 142 (e.g., via a communication device), which transmits a respective indication of the arrival accordingly to the device 102.

Figure 4:
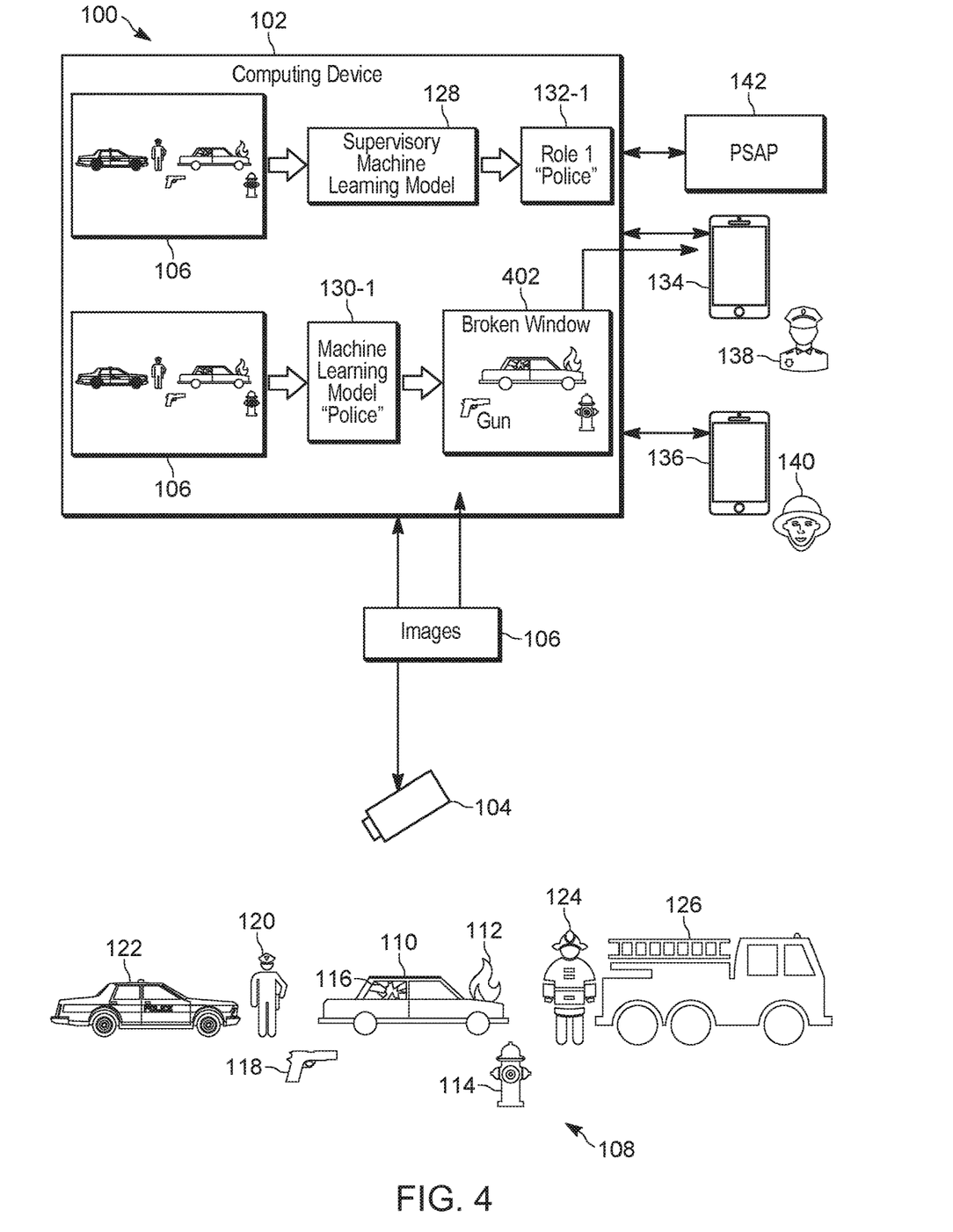
FIG. 4 depicts aspects of a method for implementing role-based machine learning models being implemented by a computing device of the system of FIG. 1, in accordance with some examples.
Figure 5:
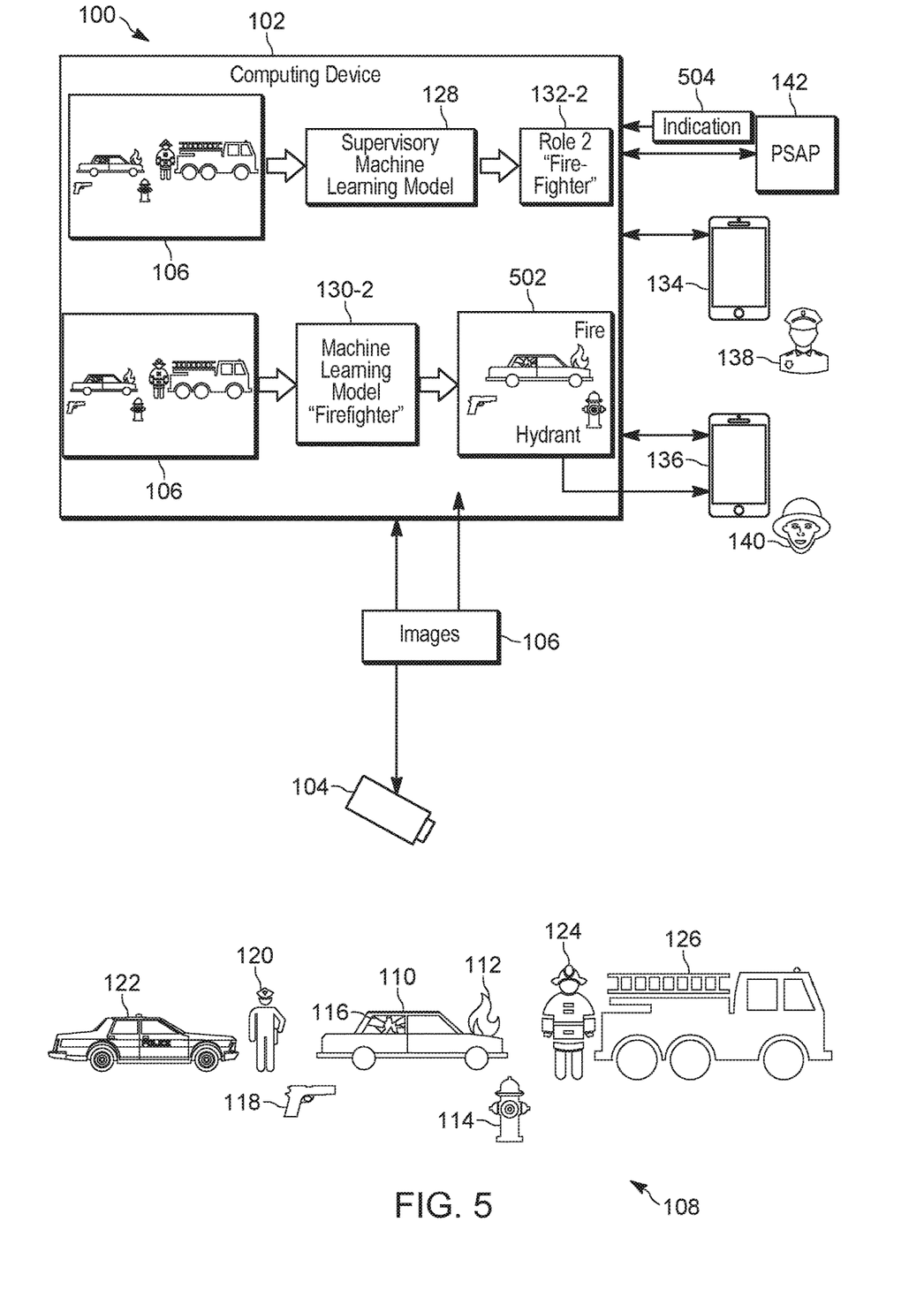
FIG. 5 depicts further aspects of a method for implementing role-based machine learning models being implemented by a computing device of the system of FIG. 1, in accordance with some examples.

Attention is next directed to FIG. 4 and FIG. 5, which depict aspects of the method 300. FIG. 4 and FIG. 5 are substantially similar to FIG. 1, with like components having like numbers.

Attention is next directed to FIG. 4, in which the camera 104 is in the same orientation as in FIG. 1, and hence the device 102 is receiving (e.g., at the block 302) images 106 of the incident 108, the police officer 120 and the police car 122.

The device 102 is implementing (e.g., at the block 304) the supervisory machine learning model 128; the images 106 are input to the supervisory machine learning model 128, which outputs the first role 132-1 of "Police".

The device 102 accordingly selects (e.g., at the block 306) and implements (e.g., at the block 308) the first machine learning model 130-1 associated with the first role 132-1 of "Police". The images 106 are input to the first machine learning model 130-1 which performs analysis on the images 106, which includes, but is not limited to, extracting an annotated portion 402 of the images 106 that includes the vehicle 110, the broken window 116 and the weapon 118, the broken window 116 and the weapon 118 being labelled (e.g., as "Broken Window" and "Gun" respectfully), and which is reported (e.g., at the block 308) to the communication device 134.

Attention is next directed to FIG. 5, in which the orientation of the camera 104 has changed to receive images 106 of the incident 108, the firefighter 124 and the firetruck 126.

The device 102 continues to implement (e.g., at the block 310) the supervisory machine learning model 128, and the images 106 are input to the supervisory machine learning model 128, which outputs the second role 132-2 of "Firefighter".

The device 102 accordingly selects (e.g., at the block 312) and implements (e.g., at the block 314) the second machine learning model 130-2 associated with the second role 132-2 of "Firefighter". The images 106 are input to the second machine learning model 130-2 which performs analysis on the images 106, which includes extracting an annotated portion 502 of the images 106 that includes the vehicle 110, the fire 112 and the fire hydrant 114, the fire 112 and the fire hydrant 114 being labelled (e.g., as "Fire" and "Hydrant" respectfully), and which is reported (e.g., at the block 314) to the communication device 136.

As further depicted in FIG. 5, the PSAP 142 transmits an indication 504 to the device 102 indicating that the firefighter 124 has arrived at the scene of the incident 108, and hence, alternatively, the device 102 may begin implementing the second machine learning model 130-2 in response to receiving the indication 504.

FIG. 4 and FIG. 5, together, further represent the block 316 of the method 300 as the analysis reported to the one or more communication devices 134, 136 changes based on implementing the supervisory machine learning model 128.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot implement a machine learning model and/or algorithm, nor implement a machine learning model and/or algorithm feedback loop, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

Furthermore, a device provided herein may include a housing that contains at least some of the components of the device; however in some alternative examples a device may include components not all contained in a single housing, but rather within two or more different housings.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a communication interface; and
a controller configured to:
    receive images from a camera;
    implement a supervisory machine learning model configured to detect a first role associated with a first object detected in the images;
    select, from a plurality of machine learning models, using the first role, a first machine learning model associated with the first role;
    implement the first machine learning model to perform analysis on the images and report, via the communication interface, the analysis to one or more communication devices;
    determine, after implementing the first machine learning model, using the supervisory machine learning model, a second role associated with a second object detected in the images, the second role different from the first role;
    select, from the plurality of machine learning models, using the second role, a second machine learning model associated with the second role;
    implement the second machine learning model to perform respective analysis on the images;
    change, via the communication interface, the analysis reported to the one or more communication devices based on implementing the second machine learning model;
    determine, using the supervisory machine learning model, that when the second object is detected in the images, the first object is no longer detected in the images; and, in response
    stop implementing the first machine learning model.

2. The device of claim 1, wherein the controller is further configured to:
    determine, using the supervisory machine learning model, that the first object is no longer detected in the images; and, in response
    stop implementing the first machine learning model.

3. The device of claim 1, wherein the controller is further configured to:
    prior to the supervisory machine learning model detecting the second object in the images, receive, via the communication interface, an indication that the second object is one or more of on route to a location of the camera and located at the location of the camera; and, in response,
    implement the second machine learning model.

4. The device of claim 1, wherein the controller is further configured to implement the supervisory machine learning model configured to detect the first role of the first object detected in the images by:
    generating, via the supervisory machine learning model, a ranked list of roles of the first object; and
    selecting, via the supervisory machine learning model, the first role of the first object from the ranked list of roles.

5. The device of claim 1, wherein the supervisory machine learning model is further configured to detect, in the images, incident types of incidents, and the controller is further configured to:
    determine, via the supervisory machine learning model, a first incident type of an incident in the images, wherein one or more of the first machine learning model and the second machine learning model are further selected based on the first incident type;
    determine, via the supervisory machine learning model, that an incident type of the incident has changed from the first incident type to a second incident type; and
    change, from the plurality of machine learning models one or more of the first machine learning model and the second machine learning model to a further machine learning model selected based on the second incident type.

6. The device of claim 5, wherein one or more of the first incident type and the second incident type are selected from a ranked list of incident types generated by the supervisory machine learning model.

7. The device of claim 5, wherein the controller is further configured to:
in response to the incident changing from the first incident type to the second incident type, provide an alert to the one or more communication devices.

8. The device of claim 1, wherein the camera is rotatable and the second object is detected in the images as the camera rotates.

9. The device of claim 1, wherein the plurality of machine learning models are configured to detect one or more of respective objects, respective persons and respective actions such that the analysis by the first machine learning model and the second machine learning model results in one more of different objects, different persons and different actions being detected.

10. A method comprising:
receiving, via a computing device, images from a camera;
implementing, via the computing device, a supervisory machine learning model configured to detect a first role associated with a first object detected in the images;
selecting, via the computing device, from a plurality of machine learning models, using the first role, a first machine learning model associated with the first role;
implementing, via the computing device, the first machine learning model to perform analysis on the images and reporting the analysis to one or more communication devices;
determining, via the computing device, after implementing the first machine learning model, using the supervisory machine learning model, a second role associated with a second object detected in the images, the second role different from the first role;
selecting, via the computing device, from the plurality of machine learning models, using the second role, a second machine learning model associated with the second role;
implementing, via the computing device, the second machine learning model to perform respective analysis on the images;
changing, via the computing device, the analysis reported to the one or more communication devices based on implementing the second machine learning model;
determining, using the supervisory machine learning model, that when the second object is detected in the images, the first object is no longer detected in the images; and, in response
stopping implementing the first machine learning model.

11. The method of claim 10, further comprising:
determining, using the supervisory machine learning model, that the first object is no longer detected in the images; and, in response
stopping implementing the first machine learning model.

12. The method of claim 10, further comprising:
prior to the supervisory machine learning model detecting the second object in the images, receiving an indication that the second object is one or more of on route to a location of the camera and located at the location of the camera; and, in response,
implementing the second machine learning model.

13. The method of claim 10, further comprising implementing the supervisory machine learning model configured to detect the first role of the first object detected in the images by:
generating, via the supervisory machine learning model, a ranked list of roles of the first object; and
selecting, via the supervisory machine learning model, the first role of the first object from the ranked list of roles.

14. The method of claim 10, wherein the supervisory machine learning model is further configured to detect, in the images, incident types of incidents, and the method further comprises:
determining, via the supervisory machine learning model, a first incident type of an incident in the images, wherein one or more of the first machine learning model and the second machine learning model are further selected based on the first incident type;
determining, via the supervisory machine learning model, that an incident type of the incident has changed from the first incident type to a second incident type; and
changing, from the plurality of machine learning models one or more of the first machine learning model and the second machine learning model to a further machine learning model selected based on the second incident type.

15. The method of claim 14, wherein one or more of the first incident type and the second incident type are selected from a ranked list of incident types generated by the supervisory machine learning model.

16. The method of claim 14, further comprising:
in response to the incident changing from the first incident type to the second incident type, providing an alert to the one or more communication devices.

17. The method of claim 10, wherein the camera is rotatable and the second object is detected in the images as the camera rotates.

18. The method of claim 10, wherein the plurality of machine learning models are configured to detect one or more of respective objects, respective persons and respective actions such that the analysis by the first machine learning model and the second machine learning model results in one more of different objects, different persons and different actions being detected.

* * * * *